Nov. 23, 1954
P. TALMEY ET AL
2,695,196
HOPPER FOR STORAGE AND TRANSPORTATION
OF FINELY DIVIDED MATERIALS
Filed Sept. 15, 1948
3 Sheets-Sheet 1
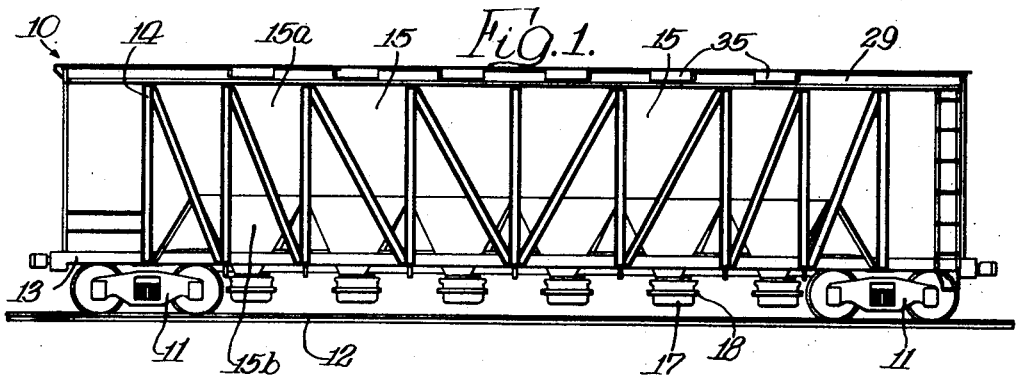
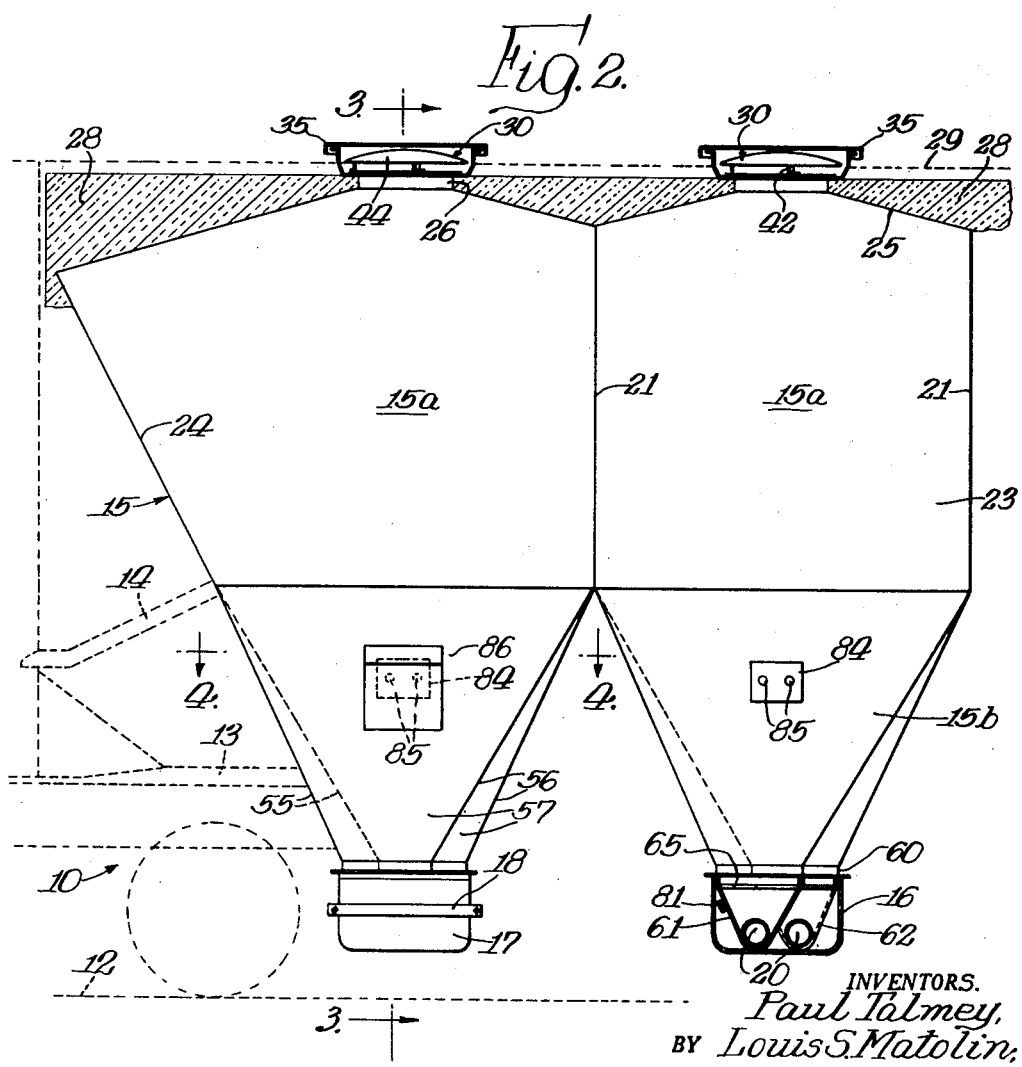
INVENTORS.
Paul Talmey,
BY Louis S. Matolin,
Smith, Olsen & Baird
Attys.

Nov. 23, 1954
P. TALMEY ET AL
2,695,196
HOPPER FOR STORAGE AND TRANSPORTATION
OF FINELY DIVIDED MATERIALS
Filed Sept. 15, 1948
3 Sheets-Sheet 2
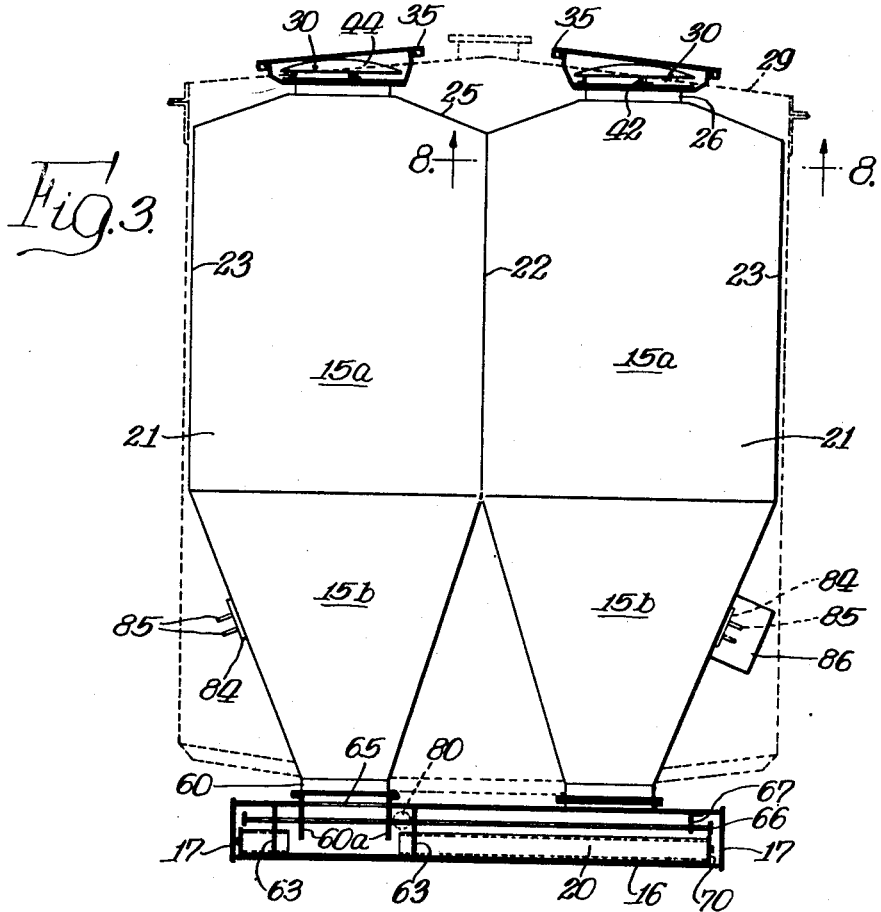
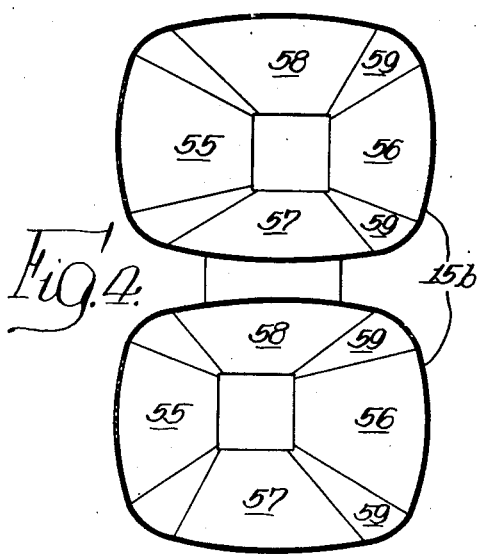
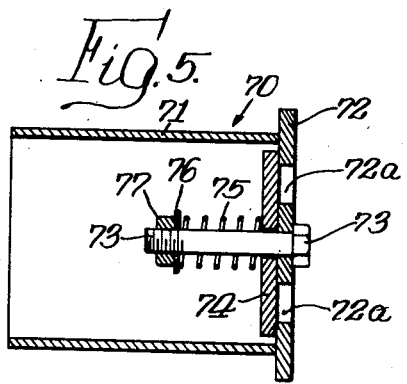
INVENTORS.
Paul Talmey,
BY Louis S. Matolin, Nov. 23, 1954 P. TALMEY ET AL 2,695,196
HOPPER FOR STORAGE AND TRANSPORTATION
OF FINELY DIVIDED MATERIALS
Filed Sept. 15, 1948 3 Sheets-Sheet 3
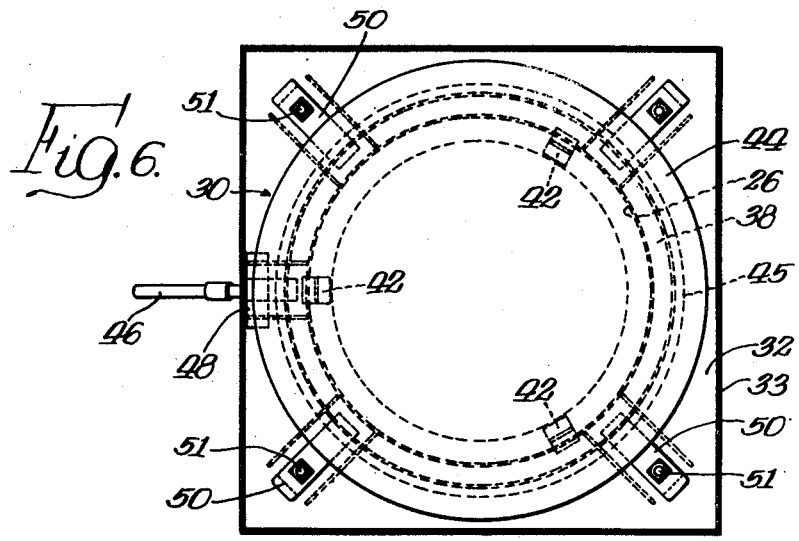
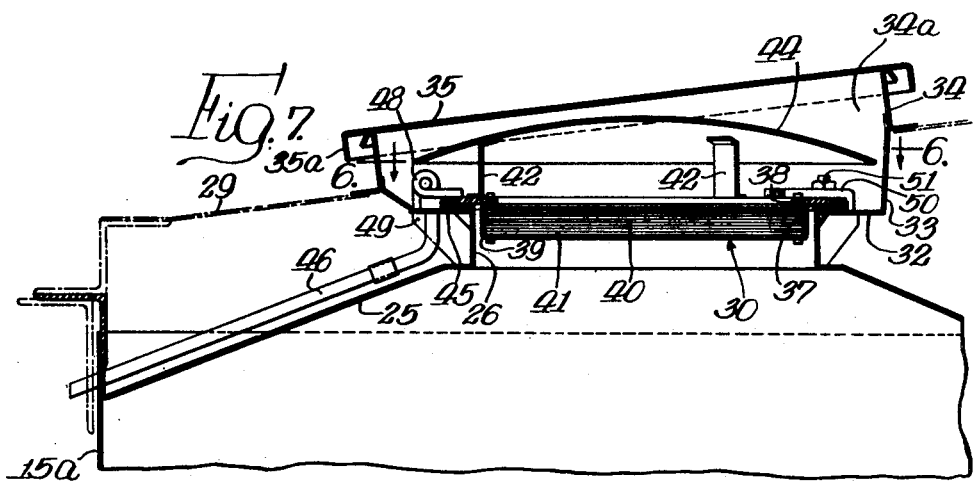
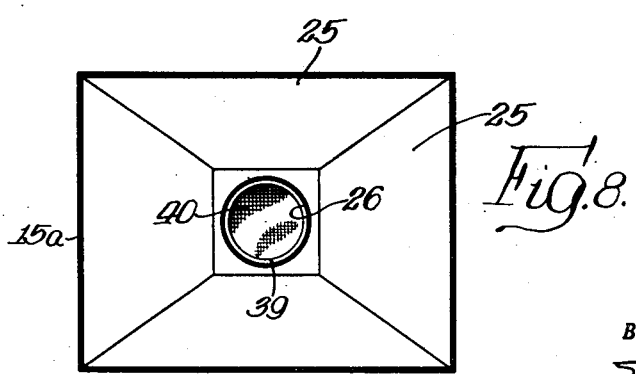
INVENTORS.
Paul Talmey,
BY Louis S Matolin
Smith, Olex & Baird
Attys.

United States Patent Office 2,695,196
Patented Nov. 23, 1954

2,695,196

HOPPER FOR STORAGE AND TRANSPORTATION OF FINELY DIVIDED MATERIALS

Paul Talmey, Barrington, Ill., and Louis S. Matolin, East Chicago, Ind., assignors to General American Transportation Corporation, Chicago, Ill., a corporation of New York Application September 15, 1948, Serial No. 49,368

2 Claims. (Cl. 302—52)

This invention relates to improved means for the storage and transport in bulk of finely divided or granular materials of a cohesive nature, such as flour, certain chemicals and the like. The invention may be employed with particular advantage in the storage and shipment of finely divided materials which require protection from contamination by dust and dirt and from accumulation of moisture.

The transportation in bulk of commodities such as those mentioned above is of great industrial importance because of the great saving in the space required for, and the expense of, storing and transporting these materials in bulk as compared with the former practice of loading them in sacks for shipment. A freight car of conventional size is capable of carrying approximately sixty tons of flour when shipped in bulk according to the principles of the present invention, whereas a freight car of the same dimensions is capable of transporting only from thirty to thirty-five tons when the flour is loaded in sacks. In addition, the practice of storage and shipment in bulk effects great savings in labor, in addition to eliminating the cost of the sacks, and, further, it greatly reduces the liability of contamination as compared with that which occurs when the powdered materials are handled by workmen while stored in sacks. While attempts have heretofore been made to provide railway cars and the like equipped to effect the transport of flour and other finely divided materials in bulk, these transportation means have not thus far met with commercial success, largely because of the liability to contamination by dirt and moisture of the materials being shipped and because of the lack of efficient means for unloading the car when it reaches its destination.

The principal object of the present invention is to provide a new and efficient means for effecting the storage and transportation of finely divided materials in bulk economically and conveniently and with little danger of contamination by dust or of accumulation of moisture in the product being shipped. Another object of the invention is to provide an efficient and completely sanitary system and method for loading, transporting and unloading finely powdered materials in bulk. A further object of the invention is to provide a railway car or the like comprising a plurality of separate hoppers arranged in pairs transversely of the car and having relatively limited transverse dimensions whereby the walls of the hoppers have a steep slope to facilitate the discharge of the powdered materials from the bottoms of the hoppers, in combination with improved means for effecting the discharge of the contents of the hoppers by pneumatic means. Still another object of the invention is to provide an improved form of hopper for the storage or shipment of finely divided materials wherein the top walls of the hopper are constructed to conform substantially to the angle of repose of the powdered materials being stored or shipped in the hopper, thereby greatly reducing the danger of condensation of moisture by reducing or substantially eliminating the air space above the materials. A further object of the invention is to provide an improved hopper for storing or shipping finely divided materials having walls which are constructed with an outwardly bowed conformation, and with the elimination of sharp corners or joints, whereby the flow of the powdered materials from the hopper toward the discharge opening thereof is facilitated. Still another object of the invention is to provide a hopper car having hoppers provided with a suction discharge system in combination with improved relief valves for controlling automatically the discharge of the finely divided materials by the application of suction. Other objects relate to various features of construction and arrangement which will appear more fully hereinafter.

The nature of the invention will be understood from the following specification taken with the accompanying drawings in which one embodiment is illustrated. In the drawings, Figure 1 shows a side elevation of a railway car constructed according to the principles of the present invention;

Fig. 2 shows an enlarged side elevation of the end portion of the car with the superstructure removed and with parts thereof illustrated in vertical section, showing the relative arrangement of two pairs of hoppers and the discharge apparatus therefor;

Fig. 3 shows an enlarged vertical section through two of the hoppers, taken on the line 3—3 of Fig. 2, with a part of the car superstructure shown by dotted lines;

Fig. 4 shows a horizontal section taken on the line 4—4 of Fig. 2;

Fig. 5 is an enlarged vertical section through one of the automatic relief valves for controlling the suction in the discharge line during the unloading operation;

Fig. 6 is a section taken on the line 6—6 of Fig. 7 showing a top plan view of one of the hatches through which finely divided materials are introduced into the car, illustrating the hatch door and filter in relation to associated parts of the structure;

Fig. 7 shows a vertical section taken transversely of the car through the center of the upper part of one of the hoppers, showing the hatch doors and associated parts of the structure, with the heat insulation removed; and Fig. 8 shows a sectional view taken on the line 8—8 of Fig. 3, looking in the direction of the arrows.

In the accompanying drawings the invention is illustrated in connection with the construction of a railway car adapted for use in transporting finely divided materials, such as flour or the like, but it will be understood that the invention may be employed in the construction of other transportation means as well as stationary storage bins and that the invention may be used for the storage and transportation of various finely divided materials other than flour.

As shown in Fig. 1, the invention is embodied in a railway car 10 supported by the usual wheeled trucks 11 upon the railway rails 12. The car has a lower frame structure 13 upon which is carried a skeleton-like superstructure designated generally by the numeral 14. Within this superstructure there are mounted a plurality of sheet metal hoppers 15, formed of stainless steel, aluminum or the like, which are arranged in two rows longitudinally of the car with the hoppers of the two rows aligned in pairs transversely of the car. Each hopper comprises an upper portion 15a of rectangular horizontal cross section which is united with a funnel-shaped bottom portion 15b arranged to converge downwardly to discharge the contents of the hopper into the suction apparatus contained in the housings 16 of rectangular vertical cross section which extend transversely of the car and which are normally closed at their ends by cover plates 17 held in place by detachable bars 18. The lower funnel portions 15b of each transverse pair of hoppers are asymmetrically arranged with respect to a center line extending transversely of the car so that they may discharge their contents into two separate suction tubes 20 located side by side in the housing 16 and extending transversely of the car. Suction lines may be connected to either end of each tube, as hereinafter described, so that the two hoppers may be emptied independently of each other and either separately or simultaneously. The suction discharge apparatus will be further described hereinafter.

Each hopper, except those at the end of the car, comprises vertical transverse walls 21, shown in Fig. 2, which are common to two adjacent hoppers in the same longitudinal row and all of the hoppers have a common wall 22 extending longitudinally of the car, as shown particularly in Fig. 3. The upper portions 15a of the hoppers also have outer walls 23 extending longitudinally of the car, each of these walls being common to all of the hoppers in a single longitudinal row. At the ends of the car, the end walls 24 of the upper portions of the endmost hoppers are inclined with respect to vertical planes, in substantial conformity with the slope of the walls of the lower funnel-shaped portions 15b of the hoppers, thereby utilizing a greater proportion of the space within the superstructure of the car adjacent the ends of the car.

The top walls 25 of the upper portions 15a of the hoppers slope downwardly from the tubular members 26 of rectangular horizontal cross section, which form the hatch openings through which the finely divided materials are introduced into the hoppers. The top walls 25 are given a slope which corresponds substantially with the angle of repose of the material being stored or shipped in the hopper, i. e., with the angle which the upper surfaces of the material assume and tend to retain with respect to the horizontal when it is dropped into the hopper through a conduit during the filling operation. This angle may vary for different powdered materials but it also varies in accordance with the height from which the powdered materials are dropped and it is therefore possible, by regulating that height, to adapt a single slope of the top walls 25 to the loading of different finely divided materials. By so doing, the air space between the upper surfaces of the material and the sloping walls 25 may be reduced to a minimum so that there will be a minimum of air above the materials from which moisture may be condensed upon changes in ambient temperature. By this construction the present invention overcomes a difficulty which has presented a substantial problem heretofore since the presence of an air space above the materials causes a condensate to collect on the ceiling of the hopper from which it may drip and cause caking of the flour in addition to bringing about the corrosion of the moistened metal. The tendency for such a condensate to collect is increased by the fact that flour is frequently loaded while at a relatively high temperature, for example, from 100° to 105° Fahrenheit, whereas the ambient temperature is generally much lower.

In order further to reduce the tendency to condensation of moisture in the hoppers above the materials contained therein, a body of heat insulating material 28 is preferably arranged to occupy the space between the top walls 25 of the hopper and the roof 29 of the car. This insulation may extend downwardly to a limited extent around the sides and ends of the hoppers but it is ordinarily unnecessary to extend it further because the tendency for condensation occurs only where air is present in the upper parts of the hoppers above the materials therein.

The insulation 28 surrounds the tubular members 26 which form the filling openings in the tops of the hoppers. These inlet members 26 are normally closed by hatch doors 30, one of these being now described, with particular reference to Figs. 6 and 7. Each tubular member 26 is connected to an annular sheet metal plate 32 which extends horizontally from the member 26 around the filling opening and which has attached thereto or formed integrally therewith an upwardly directed flange or shell 33 having its top edge attached to the car roof 29. This connection is made through the intermediate sheet metal frame 34 which is attached to the car roof and which forms the boundary of the hatch opening 34a in the car roof. This opening is normally closed by a sheet metal hatch cover 35 which has flanges 35a extending downwardly about the member 34.

While it is desirable to protect the contents of the hopper from contamination by dust from the effects of ambient temperatures, this cannot be done by providing a tight seal for the hopper because some types of lading require some connection with the atmosphere and a certain breathing action during storage and transit and because of the danger that workmen might neglect to break the seal before applying suction to the hopper. Each hopper is therefore provided with means for closing the tubular inlet 26 by means adapted to permit the necessary breathing action and the inflow of air during the unloading operation while at the same time preventing the access of dust to the contents of the hopper. For this purpose the plate 32 has seated thereon an annular rubber gasket 37 upon which rests the metal ring 38 of the hatch door 30. This metal ring has attached thereto an annular metal channel 39 in which there are secured a plurality of superimposed layers of wire screening 40 adapted to form a filter to prevent the access of dust to the interior of the hopper. This wire screening is preferably of very small mesh and linen cloth or the like may be substituted therefor if desired. If the contents of the hopper do not require a breathing action during storage and transit, a substantially tight seal may be formed by providing a diaphragm 41 of paper or the like at the bottom of the layers of wire screening which will positively prevent the entrance of any dust and, when suction is applied to the lower part of the hopper for unloading purposes with the hatch door closed, this paper sheet may be automatically ruptured by the suction to permit the necessary access of air while the suction is in operation, thus facilitating the discharge of materials and overcoming any danger of collapse of the hopper walls.

The metal ring 38 of the hatch door 30 has mounted thereon three upwardly extending brackets 42 which have secured to the upper flanges thereof a metal hood 44 in the form of an inverted shallow dish of curved cross section which extends outwardly to a substantial degree beyond the outer margins of the member 38. With this arrangement, any moisture which condenses beneath the hatch cover 35 and above the lower hatch cover 30 will run off of the hood 44 and collect on the plate 32, which is provided with an annular metal sealing ring 45 located outwardly of the member 37 to provide a channel in which this moisture may collect. This condensate is then conveyed away by gravity from the channel outside of the ring 45 through a tube 46, shown in Fig. 6, which is arranged to extend downwardly above the top plate 25 of the hopper. The metal ring 38 of the hatch cover 30 is connected by a hinge 48 to a supporting bracket 49 and the cover is normally secured in closed position by four locking lugs 50 which are pivoted on vertical bolts 51 around the outer margin of the door. After removing the upper hatch cover 35 and disengaging the locking lugs 50, the cover 30 may be swung upwardly about this hinge.

The hatch door 30 and associated parts which have just been described do not in themselves constitute a part of the present invention but are claimed in a copending application of Paul Talmey and John M. Gleason, Serial No. 53,574, filed October 8, 1948, now Patent No. 2,641,-202, June 9, 1953.

In order to facilitate the flow of the finely divided materials from the hoppers to the suction discharge devices at the bottoms thereof, the sheet metal plates which make up the lower tapered sections 15b of these hoppers are arranged to be bowed outwardly as shown in Fig. 4 and the edges of the plates which make up the composite funnel-like structure of each hopper portion are welded together so that there is a substantial elimination of sharp cracks and crevices in which the flour or other material may collect with a consequent tendency to cause erosion and to retard the downward flow. The weight of the material within the hopper tends to bow the plates of the lower hopper portion outwardly and by giving them an initial curvature in that direction, the stresses in the metal at the joints are substantially reduced, thus reducing any tendency for opening at the joints. For this purpose, each lower hopper portion is made up of end plates 55 and 56 and side plates 57 and 58 which are tapered downwardly and these plates are united with each other at the corners of the hopper portion by means of corner plates 59. At the tops of the hopper portions 15b, the plates 55, 56, 57 and 58 are straight in cross section and the corner plates 59 are angular in cross section to conform to the rectangular formation of the upper hopper portion 15a but, immediately below the tops of these lower portions 15b, all of the plates which make up these lower portions are bowed upwardly as shown in Fig. 4 so that the wall of the lower funnel-like portion of the hopper is convex outwardly substantially from the top to the bottom thereof where the plates are again made straight in cross section to conform to the outlines of the rectangular chutes 60 which lead from the hopper portions 15b to the discharge hoppers 61 and 62 which are located within the housing 16. Since the lower parts 15b of the hoppers of each pair are asymmetrically arranged, the discharge hoppers 61 and 62 have a corresponding offset arrangement, as shown in Fig. 2, and they are of trough-like form with the suction tubes 20 mounted in and conforming to the curvatures of their lower portions.

The suction tube 20 for each discharge hopper is discontinued within the hopper which is closed at its ends by vertical walls 63, having apertures therein which are closely fitted by the sections of the associated suction tube. The inlet chute 60 for each discharge hopper is provided with end walls 60a which extend downwardly into the discharge hopper but terminate above the lower part thereof, as shown in Fig. 3, so that the flour or other material is discharged into the path of the suction acting through the tube 20.

The lower end of each inlet chute 60 is normally closed by a plurality of gate valves or louvers 65 which occupy a horizontal plane at the upper margin of the associated discharge hopper when they are in closed positions as shown in Fig. 2. They may be pivoted about longitudinal axes through the operation of a rotatable rod 66 mounted in brackets 67 carried within the housing 16, as shown in Fig. 3. Through suitable linkage, not shown, the rotation of one of the rods 66 will open or close the louvers 65 for the discharge hopper 61 or 62 through which the finely divided materials are to be discharged from the associated hopper 15.

The suction tubes 20 terminate short of the ends of the housing 16, as shown in Fig. 3, and their ends are normally closed by vacuum caps 70 having the form shown particularly in Fig. 5. Each cap 70 comprises a cylindrical portion or sleeve 71 adapted to fit over the end of a suction tube 20, although it may be formed to fit within the tube. The outer end of this cylindrical portion 71 is closed by a circular plate 72 which is fixed thereto and of such diameter that it overlaps the end of the suction tube when the part 71 has been inserted therein. The plate 72 is provided with a plurality of holes 72a distributed around the central part thereof in which there is fixed a bolt or rod 73. This bolt is welded or otherwise rigidly secured to the plate and extends inwardly therefrom within the cylindrical portion 71. A circular valve plate 74 has a central aperture which is engaged by the bolt 73 and is of such diameter that it closes the apertures 72a when it is in contact with the plate 72. It is normally held in this closing position by a coil spring 75 mounted on the bolt and engaged at its free end by a washer 76 and nut 77. The nut may be adjusted on the bolt to regulate the amount of suction which is required to open the ports 72a and the degree of opening thereof during the withdrawal of flour or other material through the tube to which this vacuum relief valve is applied.

In the operation of the apparatus, assuming that it has been decided to withdraw the finely divided material from one end of a tube 20 associated with one of the hoppers mounted above that tube, the plate 17 is removed from that end of the housing 16 through which the material is to be withdrawn, and the suction line leading from the source of suction is attached to that end of the tube. The plate 17 may also be removed from the opposite end of the housing 16 so that access may be had to the vacuum relief valve 70 at that end. Then, upon opening the louvers 65 associated with that tube by operating the connecting rod 66, the flour or other material will be moved by suction through the unloading hopper 61 or 62 into the tube and be carried out by air into the pneumatic or suction line. As this takes place, the valve plate 74 at the end of the tube opposite that from which the withdrawal is being made will open in response to the suction to an extent which is proper for causing a satisfactory withdrawal of the flour or other material. By adjusting the vacuum relief valve to permit a proper admixture of air, the effective suction may be controlled in order to produce a steady and substantially uniform withdrawal of the flour as the unloading operation proceeds and to provide sufficient air to carry the material out through the suction line. Near the end of the unloading operation, there is a tendency for the finely divided material to move out too rapidly from the hopper with the possible effect of clogging the pneumatic line and it is, therefore, desirable to admit additional air to the unloading hopper as the end of the unloading operation is approached. This may be done by opening auxiliary relief valves 80 which are diagrammatically illustrated in Fig. 3 and which may be opened manually by a suitable linkage illustrated diagrammatically at 81 in Fig. 2. It is, of course, apparent that with this arrangement of apparatus the flour or other finely divided material may be withdrawn from either end of a suction tube 20 and also that, if two suction lines are available, the material may be withdrawn from both hoppers of a transverse pair simultaneously.

It has been found that by the use of the method of the present invention according to which the material in the hopper is subjected to the action on its upper surface of atmospheric pressure and, at the same time, to the effect of suction acting through its discharge opening, while employing automatic means to control the intake of air by the pneumatic discharge line, the hopper may be effectively and efficiently unloaded. The controlled intake of air by the suction tube of the hopper provides sufficient vacuum to draw the material from the hopper, supplemented by the action of gravity and atmospheric pressure, and furnishes sufficient air for carrying the material away through the suction line.

However, notwithstanding the relatively small cross section of the hoppers as compared with their height and the steep slope of the plates which form the lower funnel-like portions of these hoppers, the finely divided material may stick to the hopper walls and form cakes or bridges upon which the suction does not act effectively. This condition is most likely to occur when operating wtih soft material of very fine texture having a cohesive tendency. In order to cause the withdrawal, at an economically possible rate, of all of the material within a hopper, under all conditions, each hopper is provided with a vibrator to coact with the action of suction. The vibrator may be applied to the hopper at any desired point and may be caused to operate during the process of unloading to casue the walls of the hopper to vibrate and thereby place the finely divided materials in the hopper in a state of flux whereby they are responsive to the action of the suction exerted thereon through the connected suction tube. In the drawings each hopper is shown as being provided on one of its walls with a fitting 84 comprising pins 85 adapted to interlock with a vibrator 86 which may be mechanically or electrically operated to produce the effect just referred to.

The present invention, therefore, provides an effective and satisfactory method of and means for storing, transporting and unloading flour and other finely divided materials in bulk without the difficulties which have characterized previous attempts to accomplish these results.

Although a certain form of the invention has been shown and described by way of illustration, it will be understood that it may be constructed in various other forms which come within the scope of the appended claims. The invention may be employed either in connection with stationary storage bins or with railway cars or other vehicles employed in the transportation of finely divided materials and it is the intention that the claims be construed to include either adaptation of the invention.

We claim:

1. The combination in means for the storage or transportation of finely divided material, of a material hopper having a discharge opening, a suction tube having communication between its ends with said opening and adapted to be connected at one end thereof to a source of suction, a vacuum relief valve connected to the other end of said tube for automatically controlling the admission of air to said tube while suction is applied to said tube, said valve comprising a sleeve having a telescoping engagement with said tube, a perforated plate secured to the outer end of said sleeve, and a spring pressed valve member normally closing the perforations of said plate and adapted to open in response to the action of said suction.

2. The combination in means for the storage or transportation of finely divided material, of a material hopper having a discharge opening, a suction tube having communication between its ends with said opening and adapted to be connected at one end thereof to a source of suction, a vacuum relief valve connected to the other end of said tube for automatically controlling the admission of air to said tube while suction is applied to said tube, said valve comprising a sleeve having a telescoping engagement with said tube, a perforated plate secured to the outer end of said sleeve, a valve plate reciprocably mounted in said sleeve to open and close said perforations, a spring acting normally to hold said valve plate in its closed position, and means for adjusting said spring to regulate the opening of said valve plate in response to the action of said suction.

References Cited in the file of this patent

UNITED STATES PATENTS

| Number | Name | Date |
|---|---|---|
| 1,810,770 | Kind | June 16, 1931 |
| 1,896,597 | Smith | Feb. 7, 1933 |
| 2,072,292 | Campbell | Mar. 2, 1937 |
| 2,108,416 | Smith | Feb. 15, 1938 |
| 2,325,432 | Simpson et al. | July 27, 1943 |
| 2,418,302 | Hornbrook | Apr. 1, 1947 |
| 2,440,379 | Norbom | Apr. 27, 1948 |
| 2,629,637 | Hornbrook | Feb. 24, 1953 |